United States Patent [19]

Redmayne et al.

[11] 4,131,545

[45] Dec. 26, 1978

[54] WATER TREATMENT

[75] Inventors: William H. Redmayne, Widnes; David Berry, Hyde, both of England

[73] Assignee: Laporte Industries Limited, London, England

[21] Appl. No.: 792,573

[22] Filed: May 2, 1977

Related U.S. Application Data

[63] Continuation of Ser. No. 668,832, Mar. 22, 1976, abandoned.

[30] Foreign Application Priority Data

Apr. 5, 1975 [GB] United Kingdom ............ 14038/75

[51] Int. Cl.$^2$ .............................................. C02B 1/20
[52] U.S. Cl. ..................................... 210/47; 210/52; 210/10; 210/66; 252/175; 252/317; 423/305
[58] Field of Search ................. 210/10, 42, 45, 47, 210/51, 56, 59, 66, 52; 252/175, 317; 423/305, 306, 308, 309, 311; 424/128, 154

[56] References Cited

U.S. PATENT DOCUMENTS 3,929,666 12/1975 Aiba et al. ............................ 252/175

FOREIGN PATENT DOCUMENTS 440400 12/1935 United Kingdom ..................... 210/47

*Primary Examiner*—Charles N. Hart
*Assistant Examiner*—Bendoît Castel
*Attorney, Agent, or Firm*—Larson, Taylor and Hinds

[57] ABSTRACT

Phosphate containing basic aluminum solutions are provided by reaction aluminum sulphate solution with phosphoric acid, adding chloride, basifying by precipitation of calcium sulphate from solution and cooling the resultant solution in a controlled manner. Preferably addition of chloride and basification occurs at a temperature of 80°–90° C and the solution is cooled to below 60° C soon after the basifying salts have been introduced. The solutions, preferably diluted to an aluminum content of 1 to 2% $Al_2O_3$ are useful for clarifying water and dewatering sewage sludge.

8 Claims, No Drawings

WATER TREATMENT

This is a continuation of application Ser. No. 668,832 filed Mar. 22, 1976 (now abandoned).

The present invention relates to processes for the production of basic aluminum solutions and the use of such solutions in the treatment of water.

In copending patent application 35490/74, we have described a process for the production of basic aluminum solutions comprising the steps of reacting an aluminum sulphate solution with calcium chloride and then with a precipitant such as calcium carbonate, hydroxide or oxide. We have now found that by modifying the above process we are able to obtain basic aluminum solutions which contain phosphate.

According to the present invention there is provided a process for the production of phosphate-containing basic aluminum solutions comprising the steps of reacting aluminum sulphate solution with phosphoric acid at elevated temperature, introducing chloride by the addition of hydrochloric acid or calcium chloride, basifying by the addition of calcium oxide, hydroxide or carbonate in order to effect preferential precipitation of calcium sulphate, and thereafter causing or permitting the solution to cool quickly to below 60° C.

When such a process is effected, loss of aluminum compounds from the solution can be substantially eliminated.

One suitable way of carrying out the first stage of the reaction is to reflux phosphoric acid with aluminum sulphate solution.

In general, it is preferable for the chloride to be added to the aluminum solution either prior to, or at the same time as the calcium carbonate, oxide or hydroxide. It is generally preferable for the step of introducing the chloride and basifying the solution to occur at a temperature in the range of from 80° C. to 90° C. In practice the chloride is conveniently introduced as an aqueous solution of calcium chloride, and the preferred basifying salt, calcium carbonate, introduced as an aqueous slurry. Introduction of such reactants in appropriate quantities into refluxing aluminum sulphate/phosphate solutions tends to produce a temperature in the range 80° C. to 90° C., but other means of adjustment of the temperature to this region may be provided, if desired.

It is of importance to control the length of time that the solution remains at elevated temperature, after introduction of the basifying salts, particularly at a temperature in excess of about 60–70° C. In any event, heating the solution immediately after introduction of the basifying salts has been completed is not recommended because it tends to lead to instability in the product. On a laboratory scale, suitable results may be obtained by allowing the solution to cool naturally immediately after introduction of the calcium carbonate. However for large scale operations it can be desirable to effect cooling so that the temperature of the solution falls quickly to below 60° C. The temperature of the solution remains above 60° C. preferably for no more than about half an hour after introduction of the basifying salts. Cooling at lower temperatures is believed not to be critical, and can be effected or permitted using any convenient method or apparatus. We have found that be effecting such a process calcium sulphate is precipitated in preference to calcium phosphate.

The molar ratio of phosphate + sulphate to aluminum in the solution produced preferably falls within the range of from 0.05:1 to 0.3:1. Particularly useful solutions have been obtained when substantially all the sulphate has been removed and the ratio of phosphate to aluminum in the solution fell within the range of about 0.1:1 to 0.15:1. Desirably sufficient calcium carbonate, oxide, or hydroxide is used to produce the basic aluminum solutions having a basicity within the range of 33% to 80%, basicities in the range 40–75% conveniently being producable. Some variations in the basicity and hence chloride content of the final solution can be obtained by appropriate variation in the amounts of calcium chloride and calcium carbonate, oxide, or hydroxide.

Solutions produced by processes according to the present invention, may be used for the treatment of water, that is to say potable water sewage or sewage sludges. In general, the solutions are employed in a rather dilute form, that is to say an aluminum content calculated as $Al_2O_3$, of about 1%. However, for ease of transportation and storage it is preferable to produce solutions having an aluminum content calculated as $Al_2O_3$ in the range of 5 to 20%. In general, we have found that it is possible to dilute solutions produced by processes according to the present invention down to concentrations of 1.0–2.0% $Al_2O_3$ without substantial impairment of stability of the solutions.

Solutions according to the present invention may be used to treat or condition potable water supplies or sewage, and is particularly directed to the conditioning of sewage sludges. Potable water, which has been treated in this way is often stored in reservoirs and water extracted from sludges is recycled through the sewage treatment plant, the outflow from which is usually discharged into nearby rivers or canals.

It is widely accepted that the phosphate ion in solution leads to eutrophication, that is to say stimulates the growth of plant matter which can lead to the blocking of such free-flowing waterways. Thus it would be expected that any treatment of water which included phosphate could lead to eutrophication problems. However, we have found that in general the phosphate is retained in flocs formed during the water treatment, and is thus not released to any substantial extent into the water supplies. In fact, we have found that treatment with basic aluminum solutions according to the present invention tend to lead in general to the lowering of phosphate levels in the water treated.

Certain embodiments according to the present invention will now be described more fully by way of example.

EXAMPLE 1

In this Example a basic aluminum solution was prepared by refluxing an aluminum sulphate solution with phosphoric acid in a mole ratio of phosphoric acid to aluminum of 0.1:1 for a period of 1.0 hour. Then an aqueous solution containing 0.7 mole of calcium chloride per mole of aluminum, and an aqueous slurry containing 0.8 mole of calcium carbonate per mole of aluminum were added to the solution simultaneously when the temperature was at 80°–90° C. The solution was allowed to cool with stirring over 2½ hours and then filtered. The basic aluminum solution resulting (10.4% $Al_2O_3$, 45.5% basicity) was stable even upon dilution to a concentration of 2.0% $Al_2O_3$.

EXAMPLE 2

In this Example a similar procedure to that of Example 1 was followed, except that the mixture of aluminum sulphate and phosphoric acid was refluxed for a period of 6.0 hours. After the addition of calcium chloride and calcium carbonate and cooling whilst stirring, calcium sulphate precipitated, and was filtered off after the solution had cooled to ambient temperature. The resultant basic aluminum solution (11.3% $Al_2O_3$, 46.1% basic) was stable itself and also when diluted.

Comparison 1

In this comparison, a similar procedure to that adopted in Example 1 was followed, except that the phosphoric acid was refluxed with the aluminum sulphate for one hour and the mixture after addition of the calcium chloride and calcium carbonate was heated to reflux for a further five hours. The resultant solution was unstable, in that precipitation of aluminum values occurred.

EXAMPLE 4

The effectiveness of the solutions produced in Examples 1 and 2 was tested for dewatering of sewage sludges by means of the Jones Filtration Test. The sludges A, B and C were from different treatment works, dealing with mixed domestic/industrial sewage.
  A. raw primary plus surplus activated of 3.6% solids
  B. raw primary plus surplus activated of 4.8% solids
  C. raw primary plus humus sludge of 3.4% solids
The amount of conditioner required to reduce the specific resistance to filtration (SR) of the sludge to values of $4.0 \times 10^{12}$ m/kg and to $3.0 \times 10^{12}$ m/kg respectively are given in terms of the percentage by weight of aluminum, calculated as $Al_2O_3$, added to the dry solids content of the sludge. In the case of the sludge from Works C, the SR values for comparison were $3.0 \times 10^{12}$ m/kg and $2.0 \times 10^{12}$ m/kg. The lower the amount of conditioner required, then the more effective is the product in dewatering. F indicated that that SR could not be reached using this product.

Comparison 2

The procedure in Example 4 was followed except that the conditioning agent employed was a basic aluminum chloride of 38.3% $Al_2O_3$ and a basicity of 63.0% which was dissolved in water to give a solution containing about 15% $Al_2O_3$.

Comparison 3

The procedure adopted in Example 4 was followed except that the conditioning agent was poly aluminum chloride commercially available from Taki Fertilizer Manufacturing Co. in Japan and had a basicity of 49.4%.
The results of Example 1 and 2 and Comparison 2 and 3 are given below.

| Sludge | Comparison | | Examples | |
|---|---|---|---|---|
| | C2 | C3 | E1 | E2 |
| A | 4.05 | F | 3.80 | 4.00 |
| B | 3.80 | 2.05 | 2.10 | 2.20 |

| Sludge | Comparison | | Examples | |
|---|---|---|---|---|
| | C2 | C3 | E1 | E2 |
| A | 4.30 | F | 4.10 | 4.20 |
| B | 4.25 | 2.35 | 2.70 | 2.40 |
| C | F | 1.00 | 0.45 | 0.50 |

| Sludge | Comparison | | Examples | |
|---|---|---|---|---|
| | C2 | C3 | E1 | E2 |
| C | F | 1.80 | 1.0 | 1.50 |

From Tables 1, 2 and 3 it can be seen that the products of Examples 1 and 2 performed as well as or better than each of the comparison products C2 C3, within the limits of error in the Jones Filtration Test.

We claim:
1. A process for the production of solutions of phosphate-containing basic aluminum compounds, comprising the steps of refluxing aluminum sulphate solution with phosphoric acid at elevated temperature above 50° C. to 90° C., introducing chloride by the addition of hydrochloric acid or calcium chloride, basifying by the addition of calcium oxide, hydroxide or carbonate in order to effect preferential precipitation of calcium sulphate and in an amount sufficient to produce a basicity of from 33 to 80% said phosphoric acid and said calcium compounds being introduced in such amounts that the molar ratio of phosphate and sulphate aluminum in said basic aluminum compounds falls within the range of from 0.05:1 to 0.30:1 and thereafter causing or permitting the solution to cool quickly to below 60° C.
2. A process as claimed in claim 1, wherein the chloride is introduced into solution having a temperature of from 80 to 90° C.
3. A process as claimed in claim 1, wherein the calcium carbonate, oxide or hydroxide is introduced into solution having a temperature of from 80 to 90° C.
4. A process as claimed in claim 1, wherein the calcium carbonate, oxide or hydroxide is introduced prior to or simultaneously with the chloride.
5. A process as claimed in claim 1, wherein the solution remains at a temperature of above 60° C. for not more than half an hour after introduction of the calcium, hydroxide or carbonate has been completed.
6. A process as claimed in claim 1, wherein substantially all the sulphate is removed from solution by precipitation as calcium sulphate and the mole ratio of phosphate to aluminum in resultant solution falls within the range 01:1 to 0.15:1.
7. A process as claimed in claim 1 wherein the resultant solution has a basicity or 40-75%.
8. A process for dewatering sewage or clarifying water comprising the steps of contacting a aqueous sewage sludge or water containing suspended matter with a basic aluminum solution produced by a process as claimed in claim 1, thereby causing the sludge or suspended matter to settle into a solid phase beneath an aqueous phase and thereafter separating the solid phase from the aqueous phase.

* * * * *